(12) United States Patent
Nakaoka et al.

(10) Patent No.: US 11,979,549 B2
(45) Date of Patent: May 7, 2024

(54) DISPLAY DEVICE

(71) Applicant: Japan Display Inc., Tokyo (JP)

(72) Inventors: Chikyu Nakaoka, Tokyo (JP); Masaaki Kabe, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 295 days.

(21) Appl. No.: 17/505,857

(22) Filed: Oct. 20, 2021

(65) Prior Publication Data
US 2022/0046224 A1 Feb. 10, 2022

Related U.S. Application Data

(63) Continuation of application No. PCT/JP2020/016010, filed on Apr. 9, 2020.

(30) Foreign Application Priority Data

Apr. 22, 2019 (JP) .................. 2019-080971

(51) Int. Cl.
*H04N 13/31* (2018.01)
*G02B 30/27* (2020.01)
*G02B 30/30* (2020.01)
*H04N 13/305* (2018.01)
*H04N 13/398* (2018.01)

(52) U.S. Cl.
CPC ............. *H04N 13/31* (2018.05); *G02B 30/27* (2020.01); *G02B 30/30* (2020.01); *H04N 13/305* (2018.05); *H04N 13/398* (2018.05)

(58) Field of Classification Search
CPC .... H04N 13/31; H04N 13/305; H04N 13/398; H04N 13/125; H04N 13/351;
(Continued)

(56) References Cited

U.S. PATENT DOCUMENTS

| 5,945,965 A | 8/1999 | Noguchi et al. |
| 2008/0278573 A1* | 11/2008 | Ropinski .............. H04N 13/305 |
| | | 348/E13.001 |

(Continued)

FOREIGN PATENT DOCUMENTS

| JP | H09-73049 A | 3/1997 |
| JP | H1028276 A | 1/1998 |

(Continued)

OTHER PUBLICATIONS

International Preliminary Report on Patentability, form 373, issued in International Patent Application PCT/JP2020/016010 dated Sep. 28, 2021, original and translation, 12 pages. (Year: 2021).*

(Continued)

*Primary Examiner* — Jeffery A Brier
(74) *Attorney, Agent, or Firm* — K&L Gates LLP

(57) ABSTRACT

According to one embodiment, a display apparatus includes a display device and an image display control circuit. The display device includes a display panel and a light controller. The light controller controls a direction of a light ray emitted from the display panel. The image display control circuit controls the display panel to display an image in which two or more parallax images having different parallax numbers are mixed, on a display surface of the display device. The image display control circuit displays a parallax image having a first parallax number in at least a first area and displays a parallax image having a second parallax number in a second area. The second parallax number is smaller than the first parallax number.

10 Claims, 12 Drawing Sheets

(58) Field of Classification Search
CPC ...... H04N 13/361; G02B 30/27; G02B 30/30; G03B 35/00; G03B 35/24
See application file for complete search history.

(56) References Cited

U.S. PATENT DOCUMENTS

| | | | |
|---|---|---|---|
| 2009/0086150 A1 | 4/2009 | Koyama et al. | |
| 2012/0044330 A1 | 2/2012 | Watanabe | |
| 2013/0307929 A1* | 11/2013 | Hattori | G06T 7/13 348/43 |
| 2013/0315472 A1* | 11/2013 | Hattori | H04N 13/128 382/154 |

FOREIGN PATENT DOCUMENTS

| | | |
|---|---|---|
| JP | 2007-304189 A | 11/2007 |
| JP | 2010-014891 A | 1/2010 |
| JP | 2012-022085 A | 2/2012 |
| JP | 2014-175813 A | 9/2014 |
| WO | WO2007/007543 A1 | 1/2007 |
| WO | WO2011/132422 A1 | 10/2011 |
| WO | WO2014/136140 A1 | 9/2014 |

OTHER PUBLICATIONS

International Search Report issued in International Patent Application PCT/JP2020/016010 dated Jun. 16, 2020. 6 pages.
Written Opinion issued in International Patent Application PCT/JP2020/016010 dated Jun. 16, 2020. 5 pages.
English translation of Office Action issued in related Japanese Patent Application No. 2019-080971 dated May 16, 2023. 6 pages.
Japanese Decision of Refusal from corresponding Japanese Patent Application No. 2019-080971, dated Sep. 26, 2023. English Translation only. 3 pages.

* cited by examiner

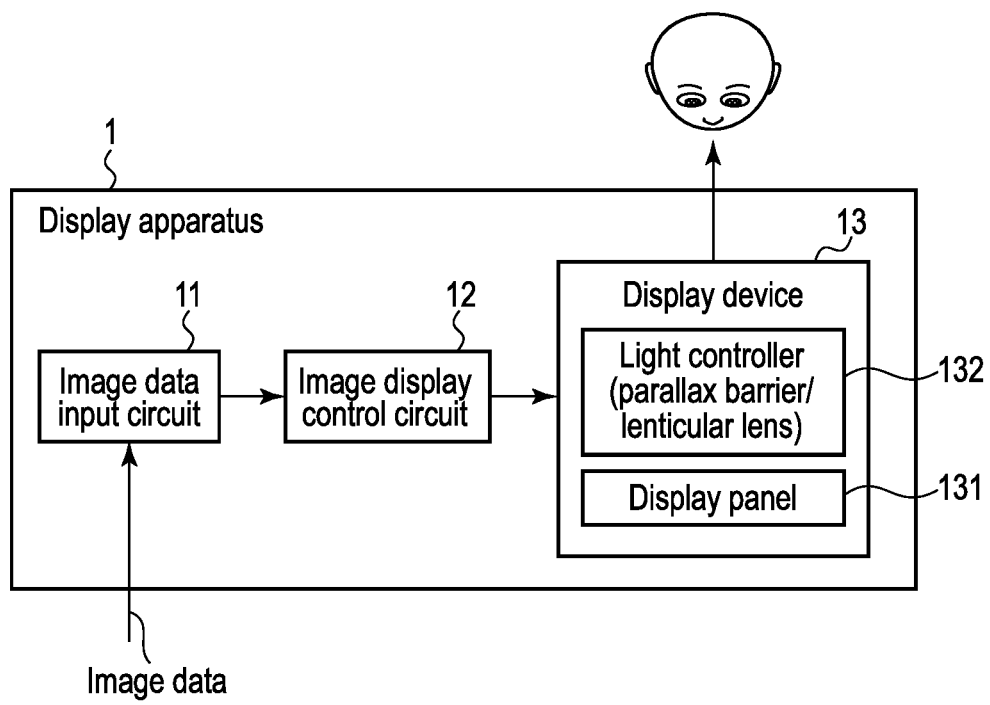
F I G. 1
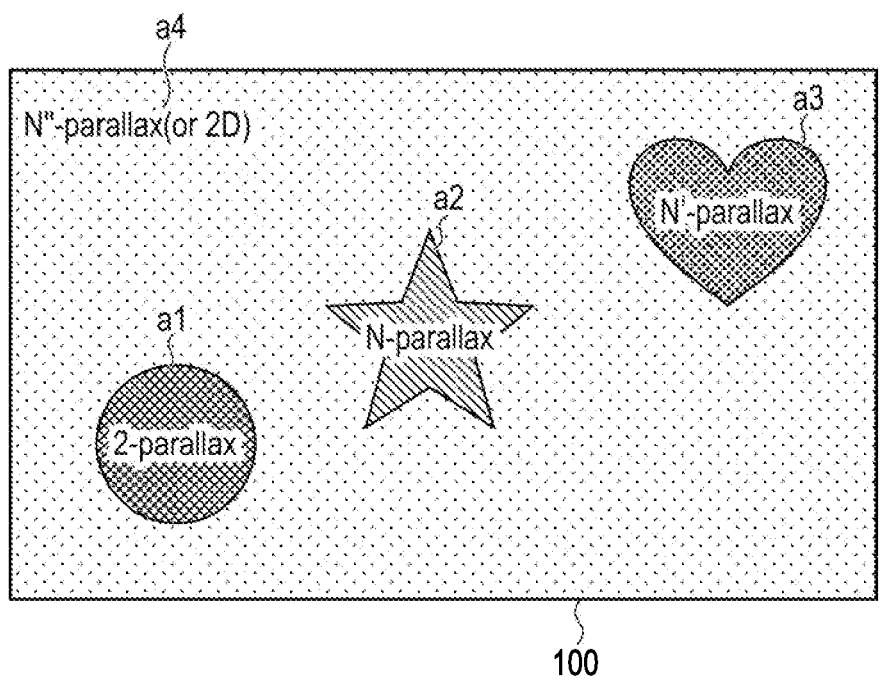
F I G. 2

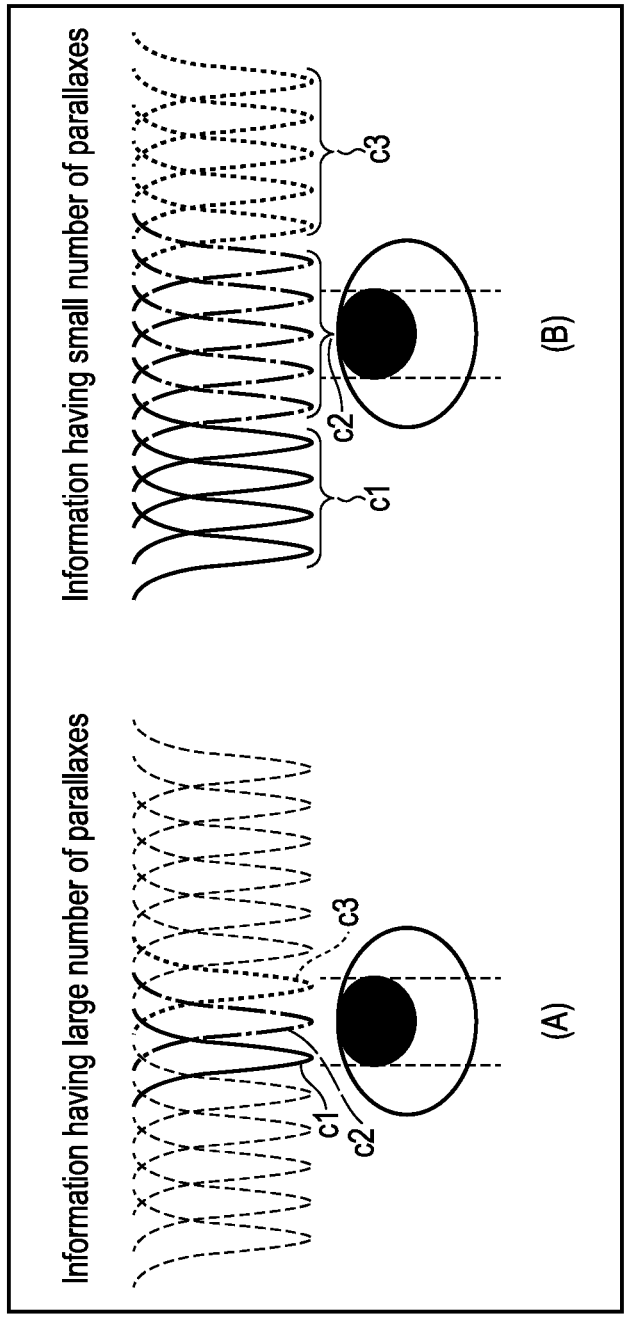
F I G. 4

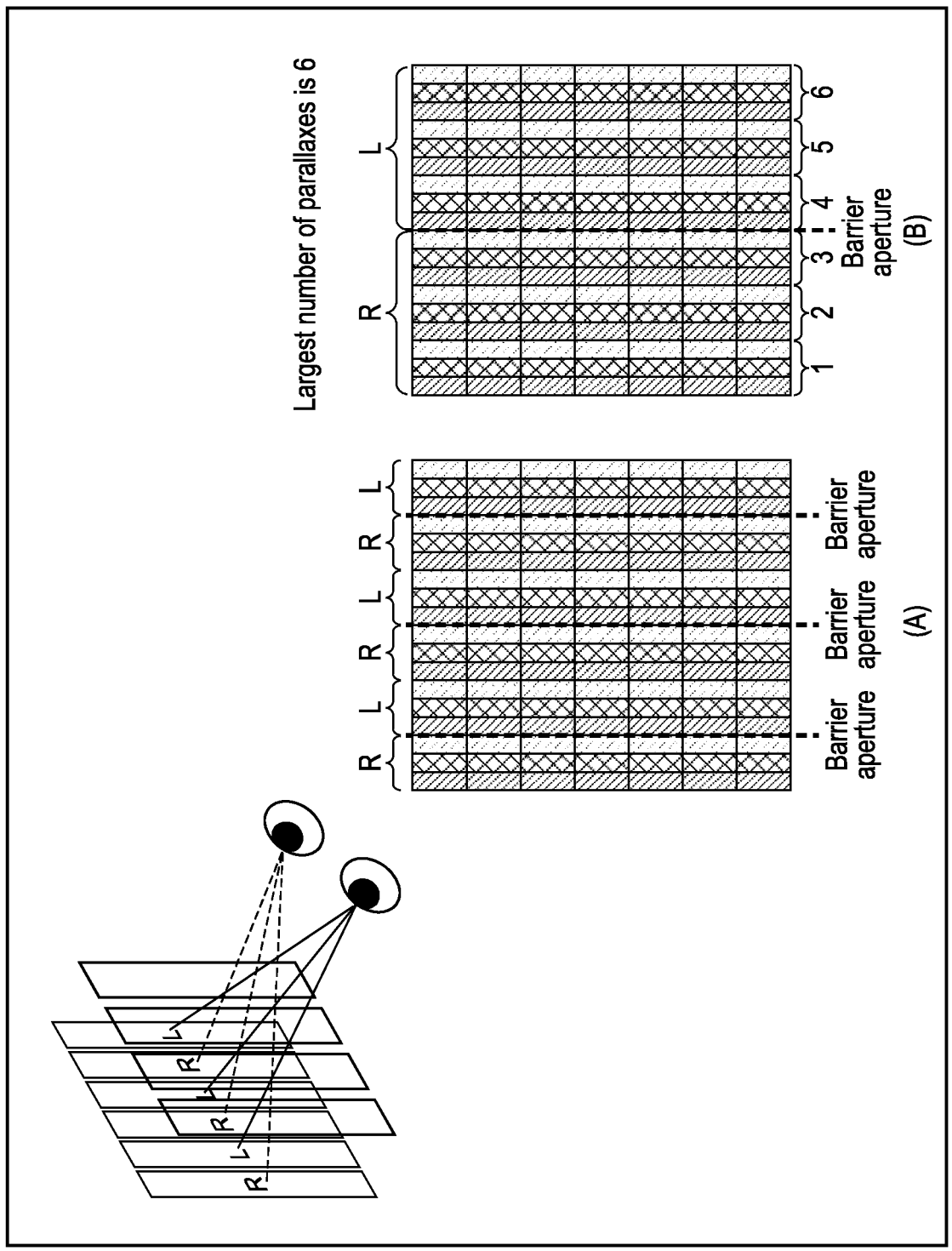
F I G. 5

DISPLAY DEVICE

CROSS-REFERENCE TO RELATED APPLICATIONS

This application is a Continuation Application of PCT Application No. PCT/JP2020/016010, filed Apr. 9, 2020 and based upon and claiming the benefit of priority from Japanese Patent Application No. 2019-080971, filed Apr. 22, 2019, the entire contents of all of which are incorporated herein by reference.

FIELD

Embodiments described herein relate generally to a display apparatus.

BACKGROUND

In recent years, a variety of display apparatuses capable of making stereoscopic views with the naked eye have been proposed. For example, there is known a display apparatus in which an image for the left eye of a viewer and an image for the right eye thereof are displayed on a display panel, and the image for the left eye is viewed with the left eye and the image for the right eye is viewed with the right eye by means of a parallax barrier, a lenticular lens and the like to show a stereoscopic image to the viewer.

BRIEF DESCRIPTION OF THE DRAWINGS

FIG. 1 is a diagram showing an example of a configuration of a display apparatus of an embodiment.

FIG. 2 is a diagram showing an example of images displayed by the display apparatus of the embodiment.

FIG. 4 is a diagram showing a state in which information having a large number of parallaxes is shown to the viewer and a state in which information having a small number of parallaxes is shown to the viewer.

FIG. 5 is a diagram for explaining an example of a configuration of a display device when a light-ray direction controller of the display apparatus of the embodiment is a parallax barrier.

DETAILED DESCRIPTION

Figure 3:
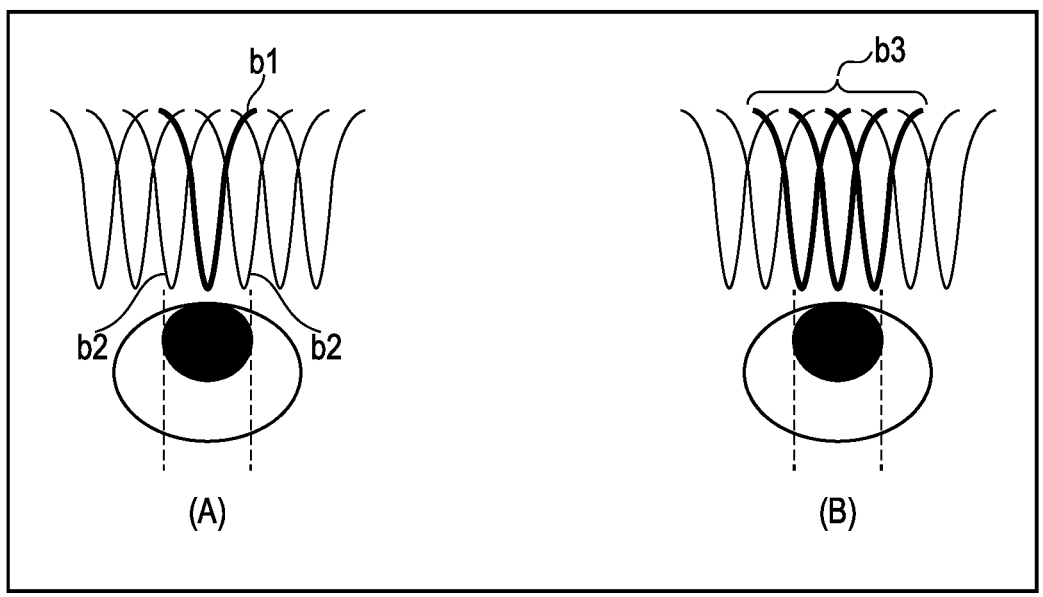
FIG. 3 is diagram for explaining an outline of a mechanism included in the display apparatus of the embodiment for inhibiting a viewer who makes stereoscopic views from feeling uncomfortable.

In general, according to one embodiment, a display apparatus includes a display device and an image display control circuit. The display device includes a display panel and a light controller. The light controller controls a direction of a light ray emitted from the display panel. The image display control circuit controls the display panel to display an image in which two or more parallax images having different parallax numbers are mixed, on a display surface of the display device. The image display control circuit displays a parallax image having a first parallax number in at least a first area, and displays a parallax image having a second parallax number in a second area. The second area is smaller than the first parallax number.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention.

Besides, in the specification and drawings, the same elements as those described in connection with preceding drawings are denoted by like reference numerals, and a detailed description thereof is omitted unless otherwise necessary.

FIG. 1 is a diagram showing an example of a configuration of a display apparatus 1 of an embodiment.

The display apparatus 1 is capable of making stereoscopic views with the naked eye and, as shown in FIG. 1, includes an image data input circuit 11, an image display control circuit 12 and a display device 13. The display device 13 includes a display panel 131 and a light-ray direction controller 132. The display panel 131 is, for example, a liquid crystal panel, and the light-ray direction controller 132 is, for example, a parallax barrier or a lenticular lens.

In the display apparatus 1, the image display control circuit 12 displays an image corresponding to image data input by the image data input circuit 11 on the display panel 131. The display panel 131 may display an image for the left eye and an image for the right eye. The image for the left eye and the image for the right eye displayed on the display panel 131 are viewed with the viewer's left eye and right eye, respectively by the operation of the light-ray direction controller 132 interposed between the display panel 131 and the viewer. The display apparatus 1 shows a stereoscopic image to the viewer by causing the viewer to view the image for the left eye with the left eye and to view the image for the right eye with the right eye.

The image displayed on the display panel 131 to show a stereoscopic image to a viewer is referred to as a parallax image or the like. The parallax image can be formed and displayed as a parallax image of various numbers of parallaxes (viewpoints) with a binocular parallax (two parallaxes: two viewpoints) as the minimum number of parallaxes.

Meanwhile, when the display apparatus is configured to display a parallax image having a large number of parallaxes, it can express a natural motion parallax by smooth parallax switching, whereas it causes a problem that the display is largely blurred due to crosstalk of adjacent parallax information items (rays from adjacent pixels) if the amount of deviation (amount of depth/protrusion) from the display surface is large.

When the display apparatus is configured to display a parallax image having a small number of parallaxes to the contrary, it can recognize a high-quality image with low crosstalk of adjacent parallax information items, whereas it cannot smooth parallax switching when the face is moved.

That is, there is a tradeoff relationship in parallax switching smoothness and image quality between a parallax image having a large number of parallaxes and a parallax image having a small number of parallaxes. The display apparatus 1 has a mechanism for achieving both parallax switching smoothness and high image quality and inhibiting a viewer who makes stereoscopic views from feeling uncomfortable. This mechanism will be described in detail below.

FIG. 2 is a diagram showing an example of images displayed by the display apparatus 1.

As illustrated in FIG. 2, the display apparatus 1 displays, on the display surface 100 of the display device 13, images in which two or more parallax images having different parallax numbers are mixed, such as, for example, a 2-parallax image a1, an N'-(N'>2) parallax image a2, and an N-(N>N') parallax image a3. In other words, the display apparatus 1 is so configured that parallax images having different numbers of parallaxes coexist on the display panel 131.

When the display apparatus 1 displays images in which two or more parallax images having different numbers of parallaxes are mixed, a parallax image that differs in the number of parallaxes from the two or more parallax images or a two-dimensional image that is a non-parallax image is displayed in an area between the two or more parallax images having different numbers of parallaxes (image a4).

Specifically, when a certain image includes contents (objects) having a large amount of deviation from the display surface 100 and contents having a small amount of deviation from the display surface 100, the display apparatus 1 displays the former contents by a parallax image having a small number of parallaxes and displays the latter contents by a parallax image having a large number of parallaxes.

That is, the 2-parallax image a1, N-parallax image a2 and N'-parallax image a3 illustrated in FIG. 2 are, for example, images for displaying contents having a large amount of deviation from the display surface 100, contents having a small amount of deviation from the display surface 100 and contents having a medium amount of deviation from the display surface 100.

As for a plurality of contents on a certain image, for example, it is conceivable that contents whose motion parallax is to be expressed smoothly are displayed by a parallax image having a large number of parallaxes and contents including characters and creating a sense of depth and a sense of protrusion are displayed by a parallax image having a small number of parallaxes.

The display apparatus 1 performs the assignment of the numbers of parallaxes within one image only by the images to be displayed on the display panel 131. In other words, the display apparatus 1 does not require any special mechanism for assigning the numbers of parallaxes within one image in the light-ray direction controller 132 and the like. The display apparatus 1 is a multiple-eye stereoscopic display apparatus capable of displaying a parallax image having a larger number of parallaxes than a binocular parallax (two parallaxes) and suitably displaying a parallax image whose parallaxes are reduced in number in an optional area on the image.

An outline of the mechanism of the display apparatus 1 for inhibiting a viewer who makes stereoscopic views from feeling uncomfortable, will be described with reference to FIG. 3.

When the light-ray direction controller 132 is a parallax barrier, the largest number of parallaxes of a parallax image that can be displayed in the display apparatus 1 depends on the number of pixels of the display panel 131 covered by the aperture pitch of the barrier. When the light-ray direction controller 132 is a lenticular lens, it depends on the number of pixels of the display panel 131 covered by the pitch of the lens. Specifically, the largest number of parallaxes corresponds to the number of pixels in one period of the parallax barrier or the lenticular lens.

In (A) of FIG. 3, the line segment indicated by reference symbol b1 and the right and left line segments of the line segment b1, which are indicated by reference symbol b2, represent light rays from one pixel of the display panel 131. As shown in (A) of FIG. 3, not only the light ray b1 from one corresponding pixel but also two light rays b2 from adjacent pixels are incident upon the viewer's eye.

When the parallax between the two light rays b2 is small, the viewer does not feel uncomfortable, but when the parallax exceeds a fixed amount, the viewer recognizes it as a blur. In other words, the viewer feels uncomfortable.

In the display apparatus 1, therefore, when the parallax between light rays from adjacent pixels is large (when it exceeds a fixed amount), that is, when the amount of deviation from the display surface 100 is large, the light rays b2 from adjacent pixels are set as the same parallax information as the light ray b1, like three line segments indicated by symbol b3 in (B) of FIG. 3, for example. Accordingly, the number of parallaxes of a corresponding area in the image decreases. In (A) of FIG. 3, the light ray b1 and the light rays b2 have different parallaxes from each other. On the other hand, in (B) of FIG. 3, all the light rays b3 have the same parallaxes, and therefore the number of parallaxes is small. The viewer can thus be inhibited from feeling uncomfortable. The image data input by the image data input circuit 11 is created in consideration of the fact that the light rays b2 from adjacent pixels is set as the same parallax information as the light ray b1.

Note that the foregoing fixed amount can be defined as a plurality of threshold values for determining whether the parallax between light rays from adjacent pixels is large. That is, the assignment of multiple numbers of parallaxes in one image can be achieved based on the threshold values. In an area between two or more parallax images having different parallax numbers, it is desirable to display a parallax image that differs in the number of parallaxes from any of the parallax images or a two-dimensional image that is a non-parallax image. It is preferable to display a two-dimensional image in particular. The two-dimensional image is preferably a single-color image, and furthermore, the single color is preferably black. In other words, it is preferable to create image data to be input by the image data input circuit 11 in an area between two or more parallax images having different numbers of parallaxes, in consideration of these.

FIG. 4 shows a state in which information having a large number of parallaxes is shown to a viewer and a state in which information having a small number of parallaxes is shown to a viewer. The advantages and disadvantages of these two states will be described again with reference to FIG. 4.

In FIG. 4, (A) shows a state in which information having a large number of parallaxes is shown to a viewer, and (B) shows a state in which information having a small number of parallaxes is shown to a viewer. The line segments indicated by symbols c1, c2 and c3 are light rays from one pixel of the display panel 131, which are different from each other in parallax information.

In the state (A) shown in FIG. 4, the viewer can recognize a smooth motion parallax. On the other hand, if there is a lot of crosstalk, the display viewed by the viewer is blurred.

In the state (B) shown in FIG. 4, the viewer can recognize a sense of depth and a sense of protrusion with high quality. On the other hand, when the face is moved, a parallax is changed greatly.

An example of configuration of the display device 13 including the display panel 131 and the light-ray direction controller 132 will be described with reference to FIG. 5 and FIG. 6.

FIG. 5 is a diagram for explaining an example of a configuration of the display device 13 in which the light-ray direction controller 132 is a parallax barrier.

In a display apparatus using a binocular parallax (two parallaxes: two viewpoints), a display device is usually configured by a parallax barrier and a display panel that displays images for the right eye (R) and left eye (R) which are alternately arranged in the horizontal direction, as shown in (A) of FIG. 5. In the display panel, one pixel includes, for example, three sub-pixels of a red sub-pixel for displaying red, a green sub-pixel for displaying green, and a blue sub-pixel for displaying blue.

The display device 13 of the display apparatus 1, which is a multiple-eye stereoscopic display apparatus, is also configured by the display panel 131 and the parallax barrier (light-ray direction controller) 132. However, as shown in (B) of FIG. 5, images for 1 to n viewpoints are arranged and displayed horizontally on the display panel 131, and the aperture pitch of the parallax barrier is set to cover n pixels (n×3 sub-pixels). In (B) of FIG. 5, the largest number of parallaxes (n) is six. As shown in (B) of FIG. 5, when the aperture pitch of the parallax barrier covers a plurality of pixels, the assignment of numbers of parallaxes in one image can be achieved only by the image.

Figure 6:
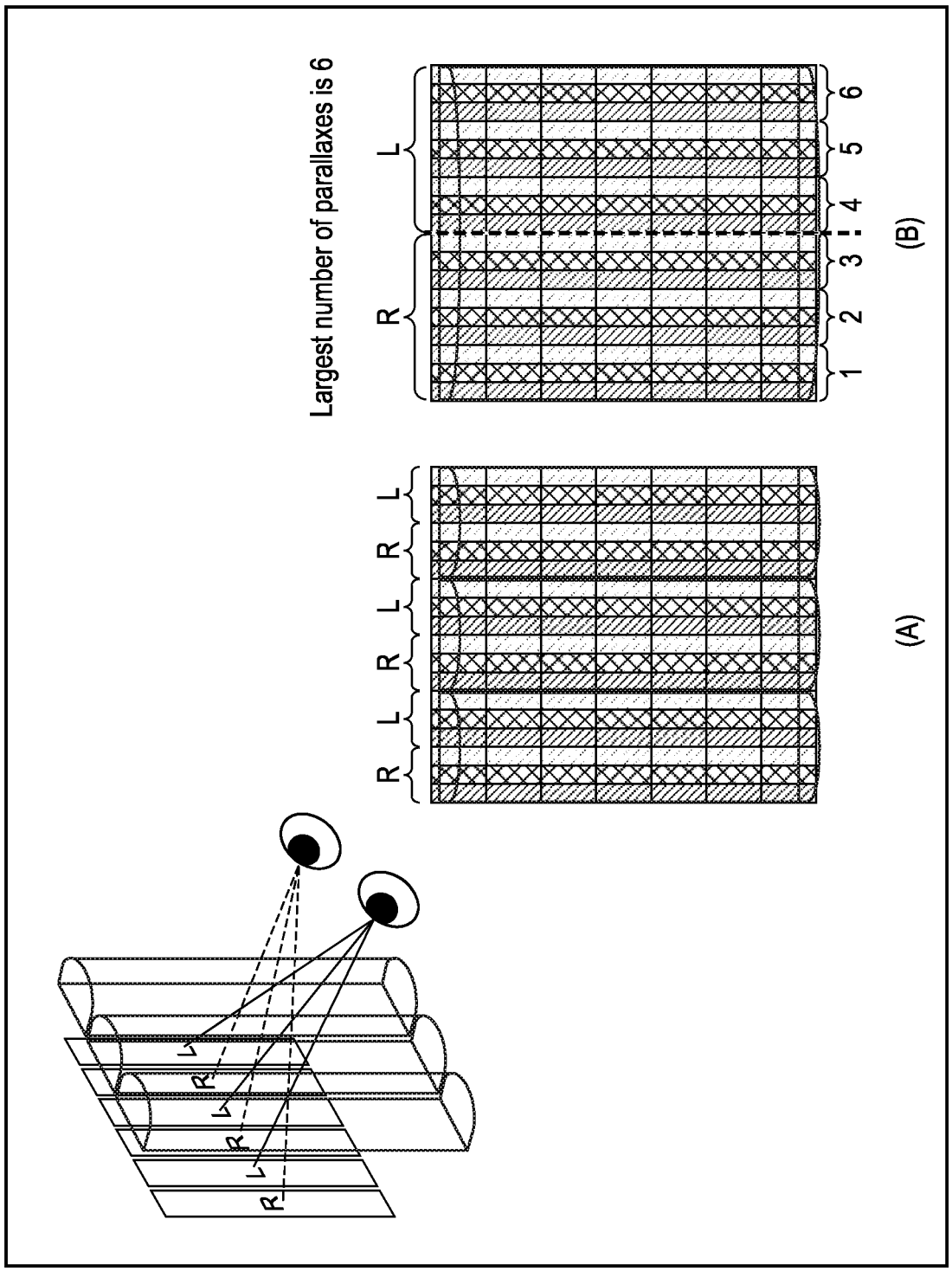
FIG. 6 is a diagram for explaining an example of a configuration of the display device when the light-ray direction controller of the display apparatus of the embodiment is a lenticular lens.

FIG. 6 is a diagram for explaining an example of a configuration of the display device 13 when the light-ray direction controller 132 is a lenticular lens.

In a display apparatus using a binocular parallax (two parallaxes: two viewpoints), a display device is usually configured by a lenticular lens and a display panel that displays images for the right eye (R) and left eye (R) which are alternately arranged in the horizontal direction, as illustrated in (A) of FIG. 6.

The display device 13 of the display apparatus 1, which is a multiple-eye stereoscopic display apparatus, is also configured by the display panel 131 and the lenticular lens (light-ray direction controller) 132. However, as shown in (B) of FIG. 6, images for 1 to n viewpoints are arranged and displayed horizontally on the display panel 131, and the pitch of the lens is set to cover n pixels (n×3 sub-pixels). In (B) of FIG. 6, the largest number of parallaxes (n) is six. As shown in (B) of FIG. 6, when the pitch of the lens covers a plurality of pixels, the assignment of numbers of parallaxes in one image can be achieved only by the image.

Figure 7:
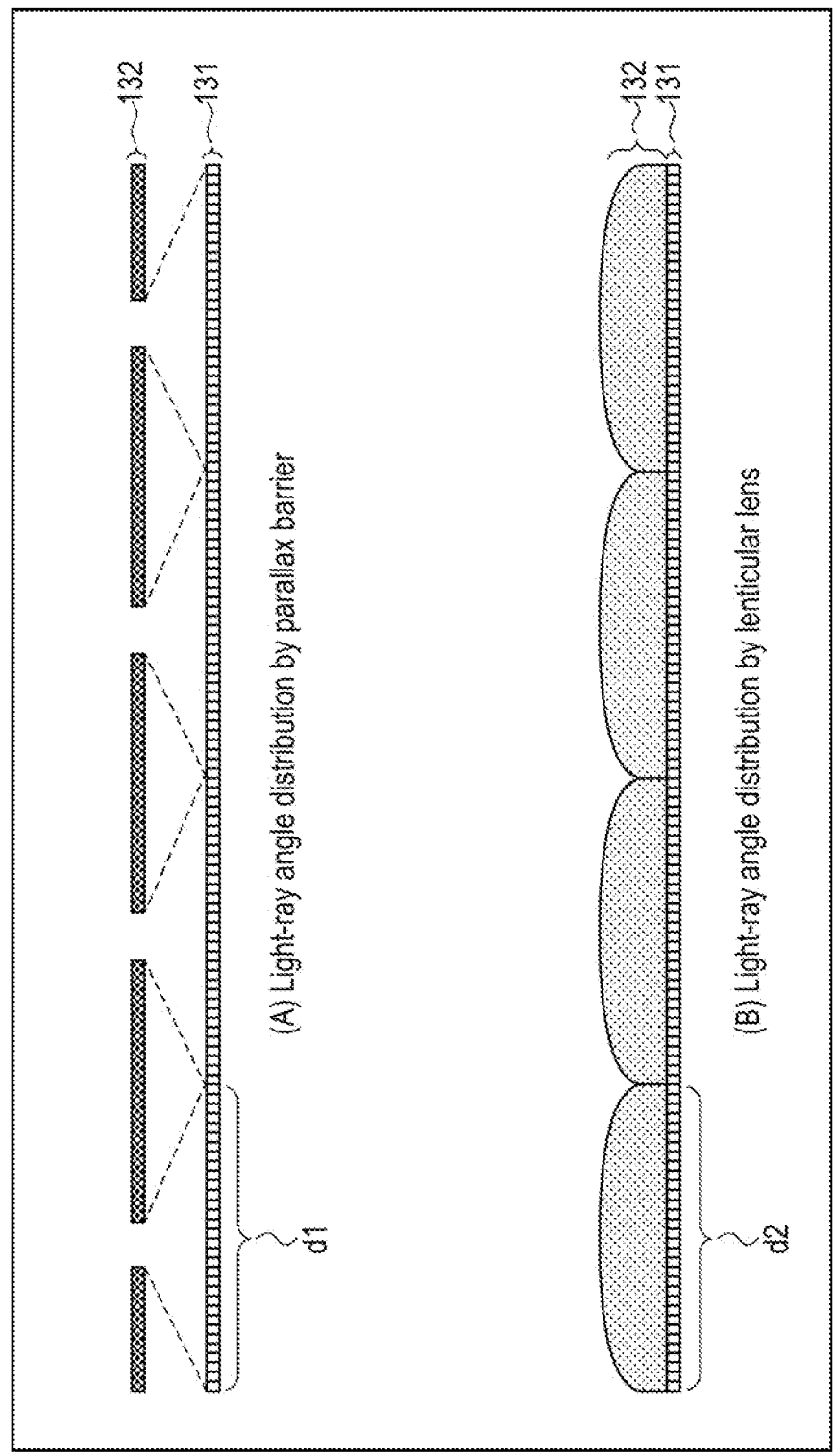
FIG. 7 is a diagram showing light-ray direction distribution by the light-ray direction controller for light rays from pixels of a display panel in the display apparatus of the embodiment.

FIG. 7 is a diagram showing light-ray direction distribution by the light-ray direction controller 132 for light rays from the pixels of the display panel 131. In FIG. 7, (A) shows a case where the light-ray direction controller 132 is a parallax barrier, and (B) shows a case where the light-ray direction controller 132 is a lenticular lens.

When the light-ray direction controller 132 is a parallax barrier, the number of pixels of the display panel 131 covered by the aperture pitch of the barrier, which is included in the range indicated by symbol d1 in (A) of FIG. 7, is determined as the largest number of parallaxes (the largest number of viewpoints) of the parallax images that can be displayed in the display apparatus 1.

When the light-ray direction controller 132 is a lenticular lens, the number of pixels of the display panel 131 covered by the pitch of the lens, which is included in the range indicated by symbol d2 in (B) of FIG. 7, is determined as the largest number of parallaxes (the largest number of viewpoints) of the parallax images that can be displayed in the display apparatus 1.

Figure 8:
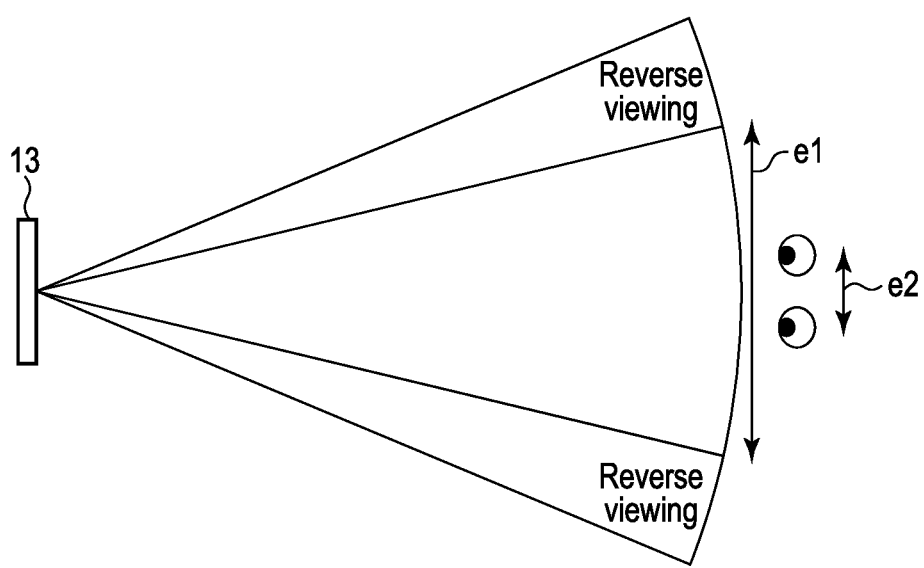
FIG. 8 is a diagram showing that the display apparatus of the embodiment is configured as a device in which an area that is not reversely viewed is sufficiently larger than a distance between both eyes.

Note that the display apparatus 1 is configured as a device in which an area e1 that is not reversely viewed is sufficiently larger than the distance e2 between both eyes of a viewer who views the images displayed on the display device 13, as shown in FIG. 8.

An image to be viewed from one of the two viewpoints will be described below with reference to FIG. 9.

Figure 9:
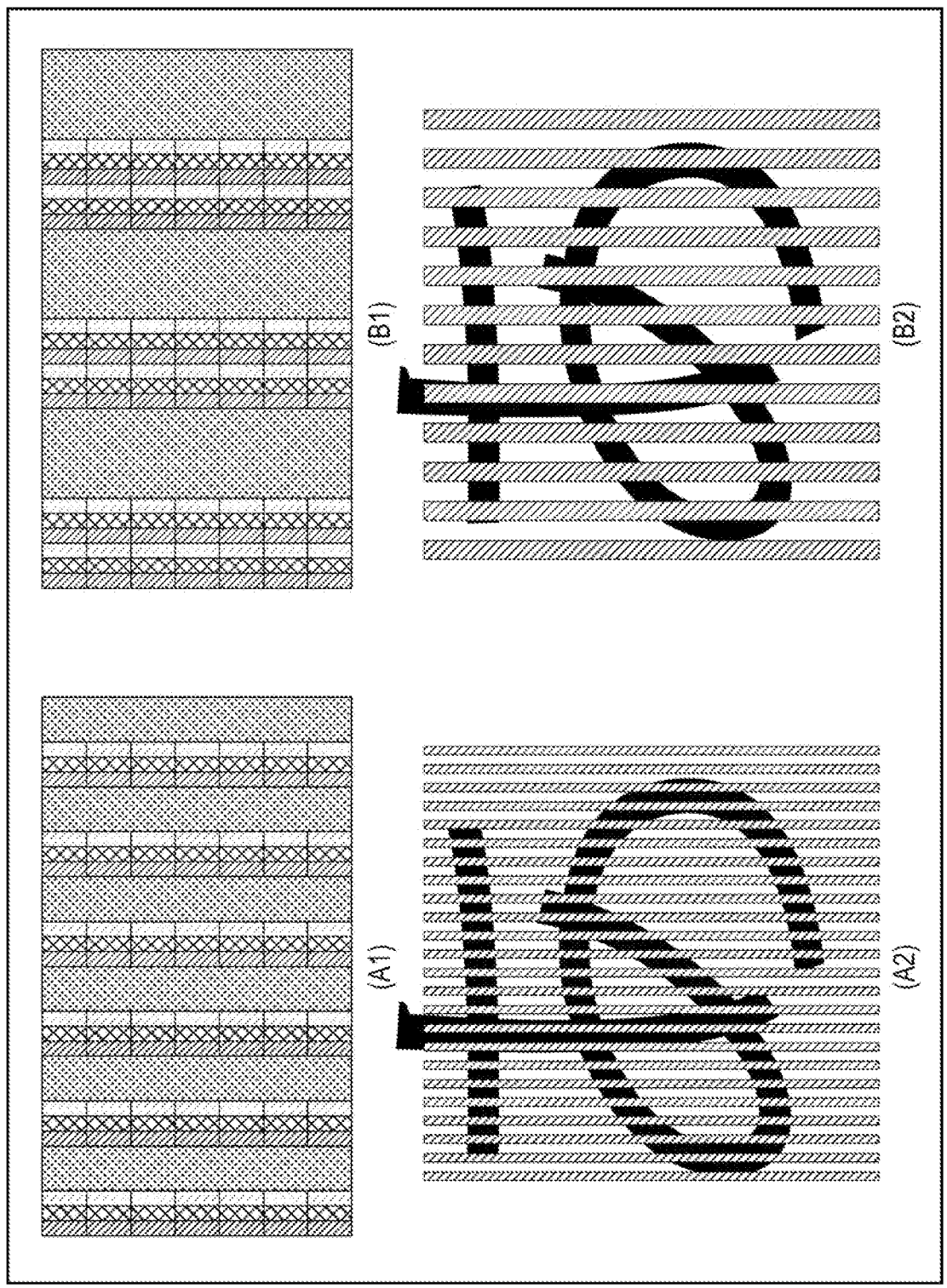
FIG. 9 is a diagram for explaining images viewed from one of two viewpoints.

In FIG. 9, (A1) shows an example of displaying an image for one viewpoint on the display device of a display apparatus using a binocular parallax (two parallax: two viewpoints), and (A2) shows an example of displaying an image for one viewpoint when a parallax image for two parallaxes is displayed on the display device of a multiple-eye stereoscopic display apparatus in which the largest number of parallaxes is four. When a parallax image of two parallaxes is displayed, two pixels (red sub-pixel, green sub-pixel and blue sub-pixel) arranged in the horizontal direction in (A1) emit light rays of the same parallax information.

In FIG. 9, (B1) shows an example of a viewer's sight of an image for one viewpoint displayed as indicated in (A1), and (B2) shows an example of a viewer's sight of an image for one viewpoint displayed as indicated in (A2).

As shown by (A1) and (B1), and (A2) and (B2) in FIG. 9, the resolutions (information items) per viewpoint are the same. Thus, if a display apparatus is configured to display a parallax image with the largest parallax number of four, for example, the display apparatus can display a parallax image with a parallax number reduced to two, only by images. In addition, the parallax image whose parallax number is reduced can be displayed in an optional area within the display area.

Figure 10:
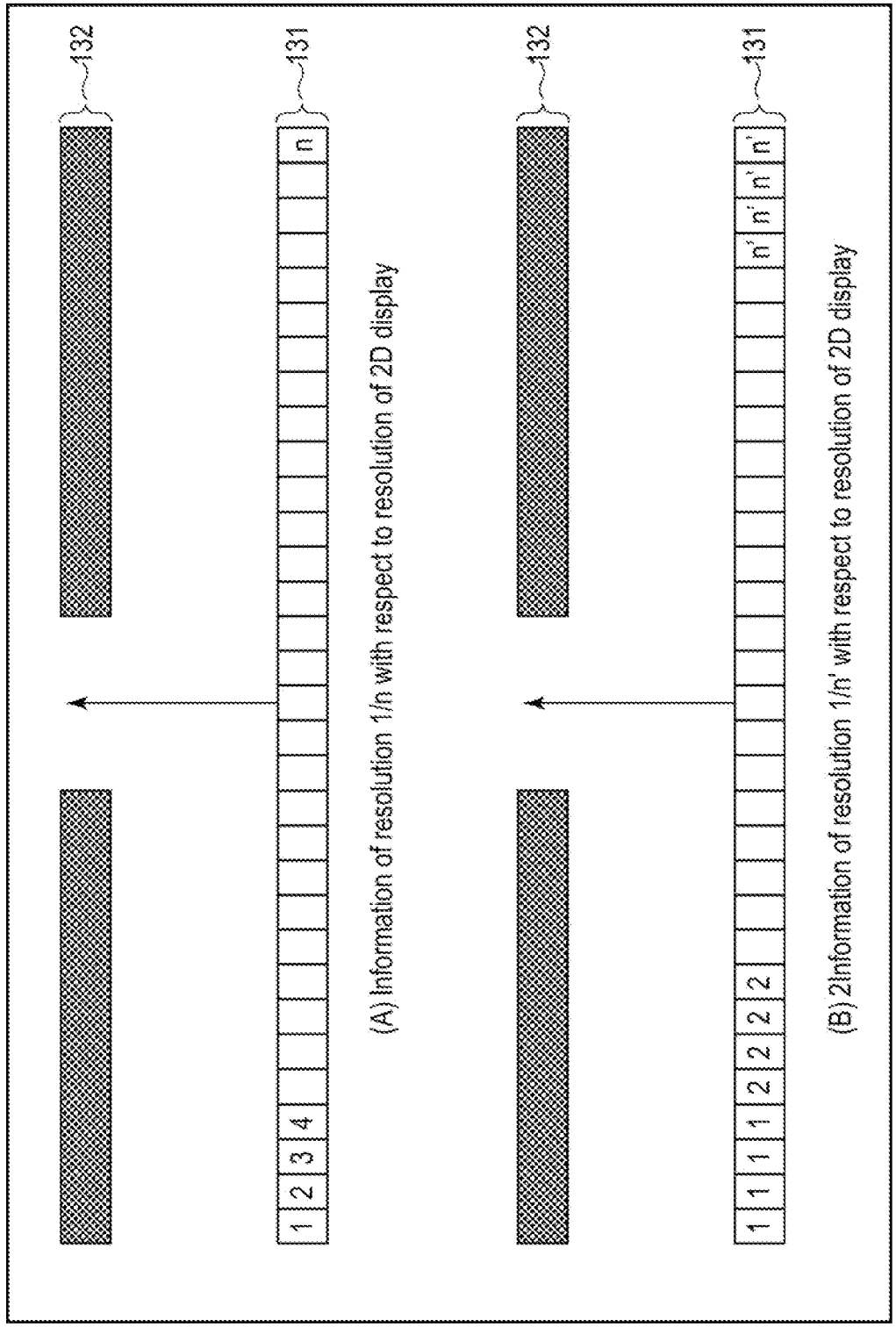
FIG. 10 is a diagram showing an example of a display of a parallax image having an optional number of parallaxes when the light-ray direction controller of the display apparatus of the embodiment is a parallax barrier.

FIG. 10 is a diagram showing an example of displaying an n-parallax image (n=the largest number of parallaxes) and an example of displaying an n'-parallax image (n'=n/4) when the light-ray direction controller 132 is a parallax barrier.

When an n-parallax image is displayed, the pixels of the display panel 131 are used to display images for n viewpoints for every n pixels as shown in (A) of FIG. 10. Thus, an n-parallax image containing information of resolution (1/n) with respect to the resolution of a two-dimensional image that is a non-parallax image is shown to the viewer.

When an n'-parallax image is displayed, the pixels of the display panel 131 are used to display images for n' viewpoints for every n pixels as shown in (B) of FIG. 10. Specifically, light rays of the same parallax information are emitted for every four pixels to display an n'-parallax (n/4-parallax) image. As a result, an n'-parallax image containing information of resolution (1/n') with respect to the resolution of a two-dimensional image that is a non-parallax image is shown to the viewer.

Figure 11:
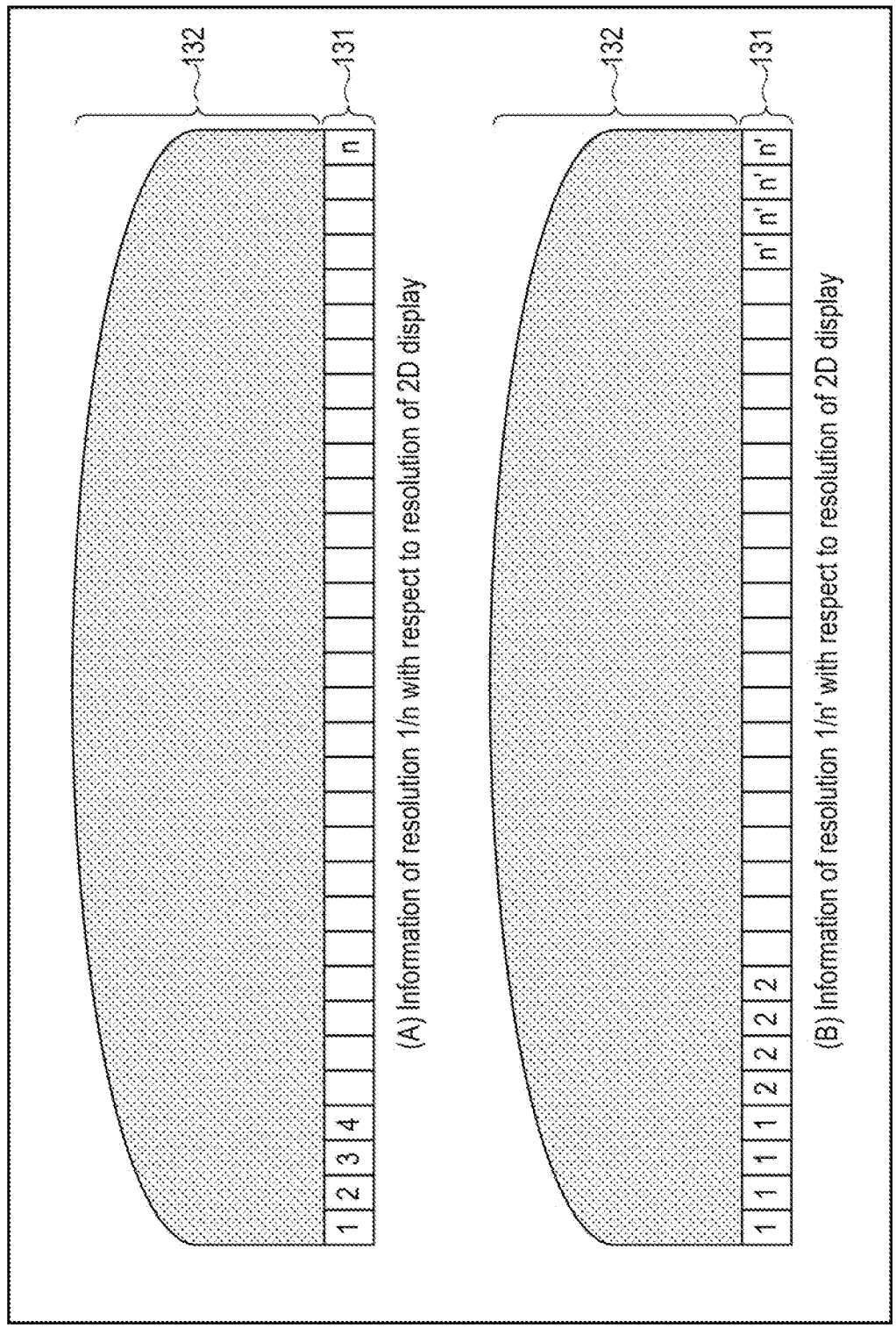
FIG. 11 is a diagram showing an example of a display of a parallax image having an optional number of parallaxes when the light-ray direction controller of the display apparatus of the embodiment is a lenticular lens.

FIG. 11 is a diagram showing an example of displaying an n-parallax image (n=the largest number of parallaxes) and an example of displaying an n'-parallax image (n'=n/4) when the light-ray direction controller 132 is a lenticular lens.

When an n-parallax image is displayed, the pixels of the display panel 131 are used to display images for n viewpoints for every n pixels as shown in (A) of FIG. 11. Thus, an n-parallax image containing information of resolution (1/n) with respect to the resolution of a two-dimensional image that is a non-parallax image is shown to the viewer.

When an n'-parallax image is displayed, the pixels of the display panel 131 are used to display images for n' viewpoints for every n pixels as shown in (B) of FIG. 11. Specifically, light rays of the same parallax information are emitted for every four pixels to display an n'-parallax (n/4-parallax) image. As a result, an n'-parallax image containing information of resolution (1/n') with respect to the resolution of a two-dimensional image that is a non-parallax image is shown to the viewer.

Regardless of whether the light-ray direction controller 132 is a parallax barrier or a lenticular lens as described above, the number of parallaxes can be controlled only by images displayed on the display panel 131, and therefore the number of parallaxes can be assigned within one image.

Figure 12:
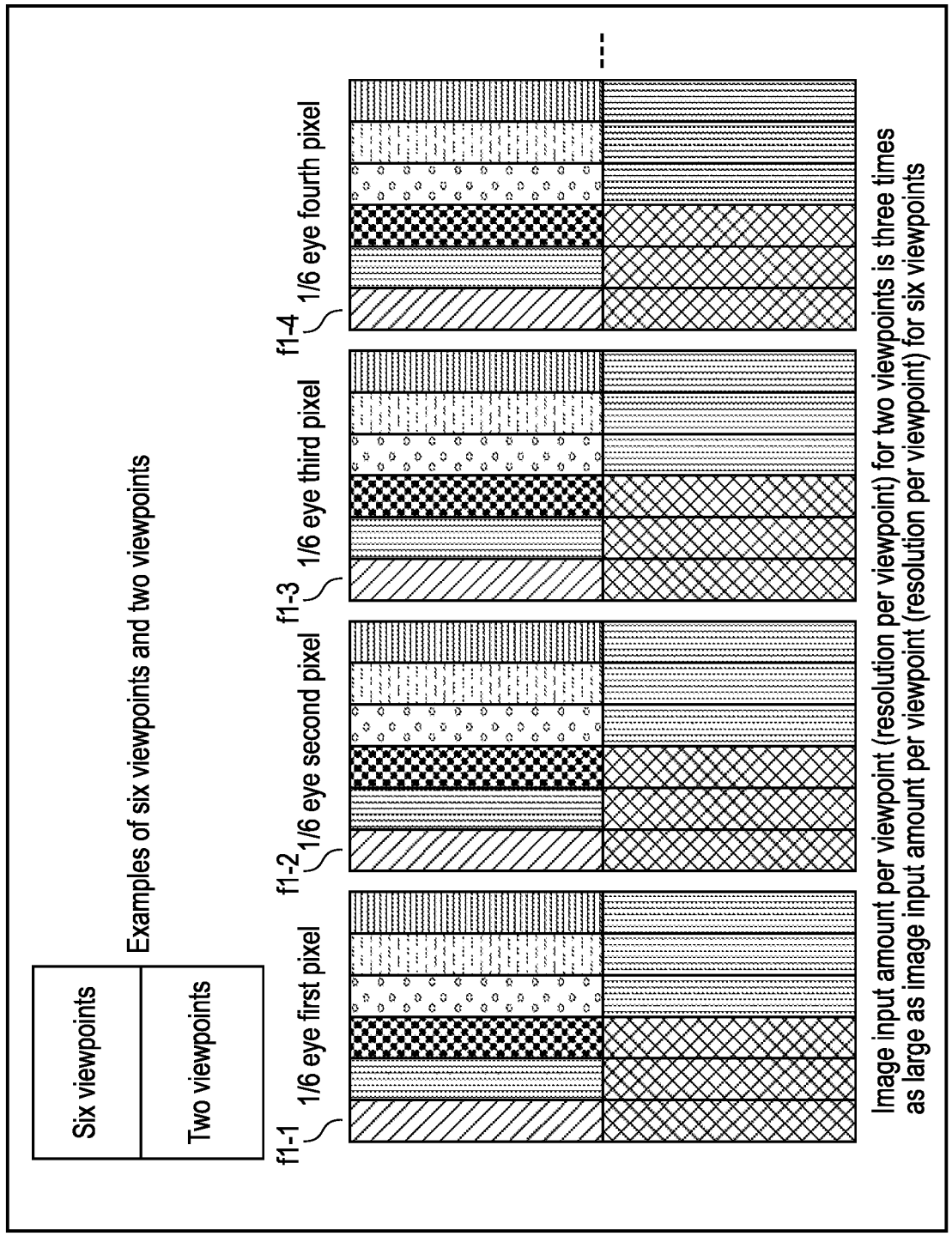
FIG. 12 is a diagram showing an example of a display of parallax images of six parallaxes (six viewpoints) and a display example of parallax images of two parallaxes (two viewpoints) on the display panel of the display apparatus of the embodiment.

FIG. 12 is a diagram showing an example of a display of parallax images of six parallaxes (six viewpoints) and an example of a display of parallax images of two parallaxes (two viewpoints) on the display panel. It is assumed here that the largest number of parallaxes of parallax images that can be displayed on the display panel 131 is six.

The rectangles indicated by symbols f1-1, f1-2, . . . in FIG. 12 correspond to the six pixels covered by the aperture pitch of the parallax barrier or the pitch of the lenticular lens shown in (B) of FIG. 5 or (B) of FIG. 6. For easy visual comparison, a display example of parallax images of six parallaxes (six viewpoints) and a display example of parallax images of two parallaxes (two viewpoints) are vertically allocated.

As shown in FIG. 12, in the parallax images of six parallaxes (six viewpoints), images for three viewpoints for the right eye are respectively displayed on the left three of six pixels, and images for three viewpoints for the left eye are respectively displayed on the right three of the six pixels. On the other hand, in the parallax images of two parallaxes (two viewpoints), an image for one viewpoint for the right eye is displayed on each of the left three of the six pixels, and an image for one viewpoint for the left eye is displayed on each of the right three of the six pixels.

That is, in the display apparatus 1, the image input amount per viewpoint (resolution per viewpoint) for two viewpoints is three times as large as the image input amount per viewpoint (resolution per viewpoint) for six viewpoints.

Figure 13:
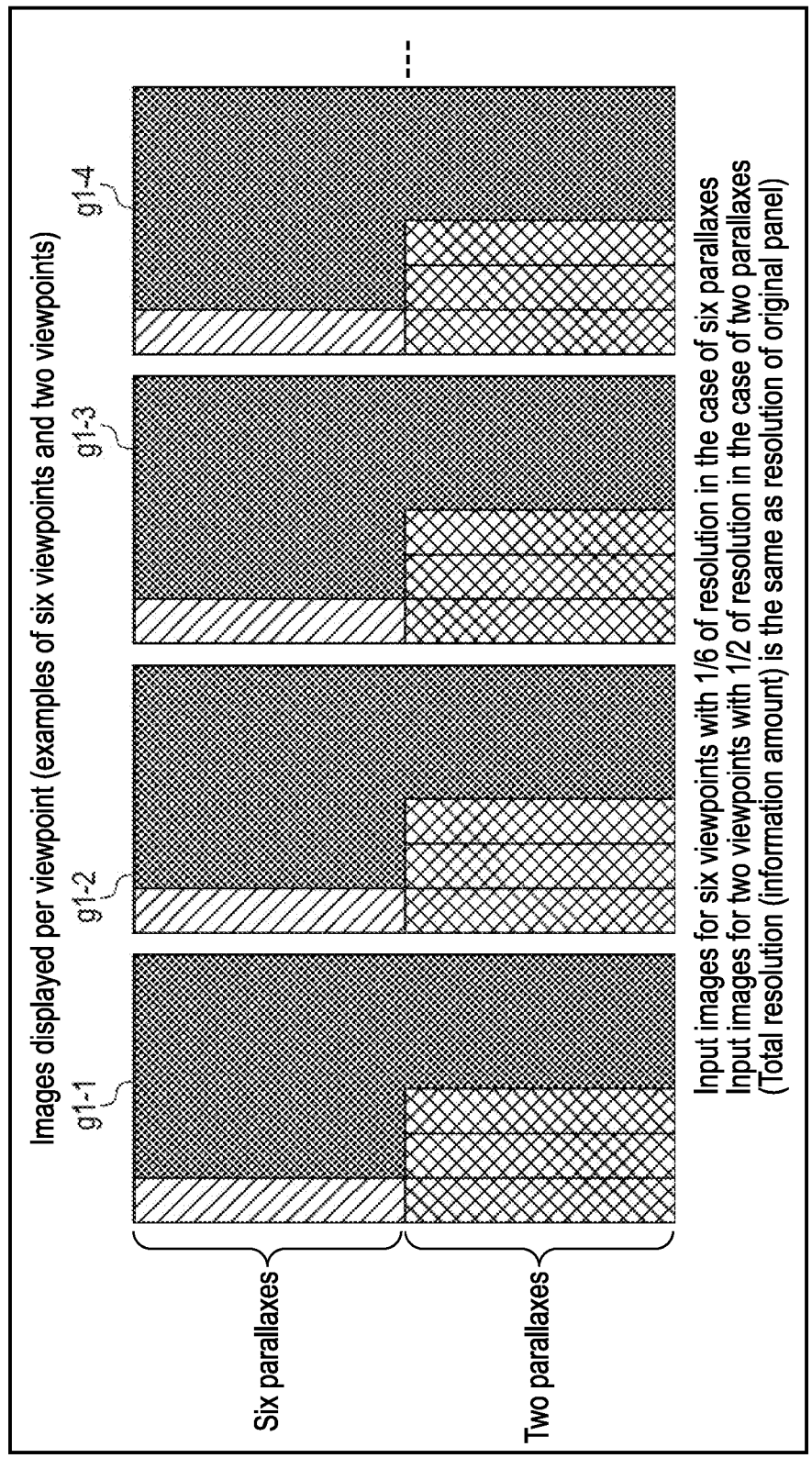
FIG. 13 is a diagram showing an example of a display of images per one of the six-parallax (six-viewpoint) images and one of the two-parallax (two-viewpoint) images on the display panel of the display apparatus of the embodiment.

FIG. 13 is a diagram showing a display example of parallax images of six parallaxes (six viewpoints) and an image per viewpoint of parallax images of two parallaxes (two viewpoints) on the display panel.

The rectangles indicated by symbols g1-1, g1-2, . . . in FIG. 13 correspond to the rectangles indicated by symbols f1-1, f1-2, . . . in FIG. 12. In other words, they correspond to the six pixels covered by the aperture pitch of the parallax barrier or the pitch of the lenticular lens shown in (B) of FIG. 5 or (B) of FIG. 6. For easy visual comparison, an example of a display of images per viewpoint of parallax images of six parallaxes (six viewpoints) and an example of a display of an image per viewpoint of parallax images of two parallaxes (two viewpoints) are vertically allocated.

As shown in FIG. 13, in the parallax images of six parallaxes (six viewpoints), an image is displayed on one of six pixels per viewpoint. On the other hand, in the parallax images of two parallaxes (two viewpoints), images are displayed on three of the six pixels per viewpoint.

That is, the display apparatus 1 inputs images (image data) for six viewpoints with ⅙ of the resolution of the display panel 131 in the case of the six-parallax images and inputs images (image data) for two viewpoints with ½ of the resolution thereof in the case of the two-viewpoint images. In either of the six-parallax images or the two-parallax images, the total resolution (amount of information) is the same as the resolution of the display panel 131.

That is, the display apparatus 1 does not require any special mechanism but can display images in which parallax images having different parallax numbers are mixed, on the display panel 131, based on image data input by the image data input circuit 11. For example, among a plurality of contents on a certain image, contents for smoothly expressing a motion parallax are displayed by parallax images having a large number of parallaxes, and contents including characters and contents for giving a sense of depth and a sense of protrusion are displayed by parallax images having a small number of parallaxes, with the result that the display apparatus 1 can inhibit a viewer who makes stereoscopic views from feeling uncomfortable.

As described above, the present embodiment provides a display apparatus capable of inhibiting a viewer who makes stereoscopic views from feeling uncomfortable, that is, a display apparatus capable of achieving both the smoothness of parallax switching and the high quality of an image.

Based on the display apparatus which has been described in the above-described embodiments, a person having ordinary skill in the art may achieve a display apparatus with an arbitral design change; however, as long as they fall within the scope and spirit of the present invention, such a display apparatus shall be encompassed by the scope of the present invention.

A skilled person would conceive various changes and modifications of the present invention within the scope of the technical concept of the invention, and naturally, such changes and modifications are encompassed by the scope of the present invention.

For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

An example of the display apparatus obtained from the configuration disclosed in this specification will be additionally noted.

(1) A display apparatus comprising:

a display device including a display panel and a light controller which controls a direction of a light ray emitted from the display panel; and an image display control circuit which controls the display panel to display an image in which two or more parallax images having different parallax numbers are mixed, on a display surface of the display device, wherein the image display control circuit displays a parallax image having a first parallax number in at least a first area and displays a parallax image having a second parallax number in a second area, the second area being smaller than the first parallax number.

(2) The display apparatus of item 1, wherein:

the first area is an area in which an object whose deviation amount from the display surface is less than a fixed amount is placed; and the second area is an area in which an object whose deviation amount from the display surface is not less than the fixed amount is placed.

(3) The display apparatus of one of items 1 and 2, wherein the image display control circuit displays a parallax image having the first parallax number at a (1/first parallax number) resolution of resolution of a two-dimensional image when the two-dimensional image is displayed on the display panel, and displays a parallax image having the second parallax number at a (1/second parallax number) resolution of resolution of the two-dimensional image.

(4) The display apparatus of item 3, wherein the image display control circuit displays a parallax image having the first parallax number in which information items of the (1/first parallax number) resolution are arranged horizontally for every first parallax number, and displays a parallax image having the second parallax number in which information items of the (1/second parallax number) resolution are arranged horizontally for every second parallax number.

(5) The display apparatus of one of items 1 to 4, wherein the image display control circuit displays a parallax image having a third parallax number other than the first parallax number and the second parallax number in an area between the parallax image having the first parallax number and the parallax image having the second parallax number.

(6) The display apparatus of one of items 1 to 4, wherein the image display control circuit displays a two-dimensional image, which is a non-parallax image, in an area between two or more parallax images having different parallax numbers.

(7) The display apparatus of item 6, wherein the two-dimensional image, which is displayed in an area between two or more parallax images having different parallax numbers, comprises a single-color image.

(8) The display apparatus of item 7, wherein the single-color image comprises a black image.

(9) The display apparatus of one of items 1 to 8, wherein the light controller comprises a parallax barrier.

(10) The display apparatus of one of items 1 to 8, wherein the light controller comprises a lenticular lens.

What is claimed is:

1. A display apparatus comprising:

a display device including a display panel and a light controller configured to control a direction of a light ray emitted from the display panel; and an image display control circuit configured to control the display panel to display an image in which two or more parallax images having different parallax numbers are mixed, on a display surface of the display device, wherein the image display control circuit is configured to display a parallax image having a first parallax number in at least a first area, and to display a parallax image having a second parallax number in a second area, the second parallax number being smaller than the first parallax number, and when contents having a large amount of deviation in the depth direction and contents having a small amount of deviation in the depth direction are included in the image, a total resolution of both contents are made the same or substantially equivalent to each other by displaying the contents having the large amount of deviation in depth direction with the second parallax number, and displaying the contents having a small amount of deviation in the depth direction with the first parallax number.

2. The display apparatus of claim 1, wherein:

the first area comprises an area in which an object whose deviation amount from the display surface is less than a fixed amount is placed; and the second area comprises an area in which an object whose deviation amount from the display surface is not less than the fixed amount is placed.

3. The display apparatus of claim 1, wherein the image display control circuit is configured to display a parallax image having the first parallax number at a (1/first parallax number) resolution of a two-dimensional image when the two-dimensional image is displayed on the display panel, and to display a parallax image having the second parallax number at a (1/second parallax number) resolution of the two-dimensional image.

4. The display apparatus of claim 3, wherein the image display control circuit is configured to display a parallax image having the first parallax number in which information items of the (1/first parallax number) resolution are arranged horizontally for every first parallax number, and to display a parallax image having the second parallax number in which information items of the (1/second parallax number) resolution are arranged horizontally for every second parallax number.

5. The display apparatus of claim 1, wherein the image display control circuit is configured to display a parallax image having a third parallax number other than the first parallax number and the second parallax number in an area between the parallax image having the first parallax number and the parallax image having the second parallax number.

6. The display apparatus of claim 1, wherein the image display control circuit is configured to display a two-dimensional image, which is a non-parallax image, in an area between two or more parallax images having different parallax numbers.

7. The display apparatus of claim 6, wherein the two-dimensional image, which is displayed in an area between two or more parallax images having different parallax numbers, comprises a single-color image.

8. The display apparatus of claim 7, wherein the single-color image comprises a black image.

9. The display apparatus of claim 1, wherein the light controller comprises a parallax barrier.

10. The display apparatus of claim 1, wherein the light controller comprises a lenticular lens.

* * * * *